(12) United States Patent
Nagumo

(10) Patent No.: US 7,287,095 B2
(45) Date of Patent: Oct. 23, 2007

(54) PROCESSING METHOD, PROCESSING APPARATUS AND STORAGE MEDIUM

(75) Inventor: Tadaatsu Nagumo, Nagaoka (JP)

(73) Assignee: Fujitsu Limited, Kawasaki (JP)

( * ) Notice: Subject to any disclaimer, the term of this patent is extended or adjusted under 35 U.S.C. 154(b) by 1134 days.

(21) Appl. No.: 09/812,846

(22) Filed: Mar. 21, 2001

(65) Prior Publication Data

US 2002/0032737 A1 Mar. 14, 2002

(30) Foreign Application Priority Data

Aug. 3, 2000 (JP) ............................. 2000-235947

(51) Int. Cl.
*G06F 15/16* (2006.01)
*G06F 15/00* (2006.01)
(52) U.S. Cl. ...................... 709/247; 709/246; 358/1.18
(58) Field of Classification Search ................ 709/246, 709/247, 216; 715/733–736; 358/1.18
See application file for complete search history.

(56) References Cited

U.S. PATENT DOCUMENTS 6,208,427 B1 * 3/2001 Lee ........................... 358/1.15
6,336,124 B1 * 1/2002 Alam et al. .................. 715/523
6,377,993 B1 * 4/2002 Brandt et al. ............... 709/227
6,489,954 B1 * 12/2002 Powlette ...................... 715/733
2002/0018077 A1 * 2/2002 Powlette ...................... 345/744

FOREIGN PATENT DOCUMENTS

JP 10-283280 10/1998

* cited by examiner

*Primary Examiner*—Jason Cardone
*Assistant Examiner*—Yasin M Barqadle
(74) *Attorney, Agent, or Firm*—Staas & Halsey LLP

(57) ABSTRACT

A processing apparatus for generating a file is provided with a data generating part which generates a data part from an original data which is input, and a file generating part which generates the file which includes various kinds of data including the data part and a data processing part having as a processing target the data part developed depending on an execute instruction. The file generating part generates the file by including an updating part which updates contents of the file using data modified by the developed data processing part.

21 Claims, 8 Drawing Sheets

PROCESSING METHOD, PROCESSING APPARATUS AND STORAGE MEDIUM

BACKGROUND OF THE INVENTION

This application claims the benefit of a Japanese Patent Application No. 2000-2335947 filed Aug. 3, 2000, in the Japanese Patent Office, the disclosure of which is hereby incorporated by reference.

FIELD OF THE INVENTION

The present invention generally relates to processing methods, processing apparatuses and storage media, and more particularly to a processing method for enabling identical document contents to be referred to and exchanged among a plurality of different apparatuses, a processing apparatus which employs such a processing method, and a computer-readable storage medium which stores a program for causing a computer to carry out such a processing method.

Recently, electronic mail has become very popular. Hence, exchange of documents among a plurality of users, is shifting from the exchange of paper media to the exchange of electronic documents among different apparatuses. Consequently, among the users which exchange the electronic documents, it is essential to enable reference to the contents of the electronic documents.

DESCRIPTION OF THE RELATED ART

Conventionally, in order to enable reference to identical electronic document contents created with a certain format among the users, it is necessary for the apparatuses, such as personal computers, which are used by the users to be set up under the same operating environment. In other words, an application program which is required to process the electronic document contents must be installed in the personal computers of each of the users.

Accordingly, each user must purchase the application program, and install the application program in his personal computer. For this reason, each user must bear the large cost of the application program, even though the user simply needs to refer to the electronic document contents.

A technique has been proposed in order to solve this problem of the conventional technique. This proposed technique generates a single execute form file which is made up of document data to be displayed and a processing program for displaying the document data. A control program which is included in the single execute form file functions as a printer driver. The control program reads the document data which is output from the application program to be printed, and generates the single execute form file together with the processing program for displaying the document data.

When the execute form file generated by this proposed technique receives an execute instruction from the user, the control program included in the execute form file carries out a process of separating and developing in a memory the document data and the processing program within the execute form file. The processing program developed in the memory has a user interface similar to that of a general application program, and carries out a display process to display the document data on a screen or a print process to print the document data on a printer, in response to an operation carried out by the user. When an execute instruction is made with respect to the execute form file, the document data is output from the first page for both the display process and the print process.

According to the proposed technique, it is unnecessary to prepare the same application program at each of the users who exchange the electronic document, unlike the conventional technique. However, the proposed technique gives rise to another problem, as described hereunder.

In other words, the proposed technique enables each of the users to make reference to the same document data. But in the case of the proposed technique, the processing program included in the execute form file is only provided with a simple document data output function for displaying or printing the document data.

When the original document data to be processed amounts to a large number of pages, the number of pages of the document data included in the execute form file which is generated by the proposed technique also becomes large. But the document data is always displayed from the first page. For this reason, in a case where the reference to the document data is discontinued halfway to end the display process and an execute instruction with respect to the execute form file is thereafter to be made again, the user must remember the page number in order to continue the reference to the document data. Furthermore, the user must carry out a troublesome operation, such as a scroll operation and a jump operation to a specified page, in order to display the page from which the reference to the document data is to be continued.

In addition, it is not possible to edit the contents of the document data according to the proposed technique. Hence, in a case where it is necessary to correct the contents of the document data, the user who generated the execute form file must start an application program which is capable of editing the original document data from which the execute form file was generated, so as to carry out an editing operation on the original document data and an execute form file generating operation using the print process. Consequently, there is a large load on the user who must carry out such operations.

On the other hand, there is another technique which compresses a plurality of files into a single self-decoding type execute form file. According to this other technique, the user who receives the self-decoding type execute form file can develop the self-decoding type execute form file into the original plurality of files by simply making an execute instruction. But when the developed files are no longer required, the user must carry out a troublesome operation of deleting the developed files which are no longer required, thereby putting a large load on the user who must carry out such a troublesome operation.

SUMMARY OF THE INVENTION

Accordingly, it is a general object of the present invention to provide a novel and useful processing method, processing apparatus and computer-readable storage medium, in which the problems described above are eliminated.

Another and more specific object of the present invention is to provide a processing method, a processing apparatus and a computer-readable storage medium, which enable reference to the same document among a plurality of apparatuses so that an efficient information sharing can be realized, and also reduce the operation load and cost load on the user.

Still another object of the present invention is to provide a processing apparatus for generating a file, comprising a data generating part generating a data part from an original data which is input, and a file generating part generating the file which includes various kinds of data including the data part and a data processing part having as a processing target the data part developed depending on an execute instruction, where the file generating part generates the file by including an updating part which updates contents of the file using data modified by the developed data processing part. According to the processing apparatus of the present invention, it is possible to enable reference to the same document among a plurality of apparatuses so that an efficient information sharing can be realized, and also reduce the operation load and cost load on the user.

A further object of the present invention is to provide a processing apparatus comprising a developing part developing various kinds of data from a file depending on an execute instruction, the various kinds of data including a data processing part and a data part which is generated from an original data and is used by the data processing part, and an updating part updating contents of the file using data modified by the developed data processing part. According to the processing apparatus of the present invention, it is possible to enable reference to the same document among a plurality of apparatuses so that an efficient information sharing can be realized, and also reduce the operation load and cost load on the user.

Another object of the present invention is to provide a computer-readable storage medium which stores a program for causing a computer to generate a file, where the program comprises data generating means for causing the computer to generate a data part from an original data which is input, and file generating means for causing the computer to generate the file which includes various kinds of data including the data part and a data processing part having as a processing target the data part developed depending on an execute instruction, and the file generating means causes the computer to generate the file by including an updating part which updates contents of the file using data modified by the developed data processing part. According to the computer-readable storage medium of the present invention, it is possible to enable reference to the same document among a plurality of apparatuses so that an efficient information sharing can be realized, and also reduce the operation load and cost load on the user.

Still another object of the present invention is to provide a computer-readable storage medium which stores a program for causing a computer to process a file, where the program comprises a developing part causing the computer to develop various kinds of data from a file depending on an execute instruction, the various kinds of data including a data processing part and a data part which is generated from an original data and is used by the data processing part, and an updating part causing the computer to update contents of the file using data modified by the developed data processing part. According to the computer-readable storage medium of the present invention, it is possible to enable reference to the same document among a plurality of apparatuses so that an efficient information sharing can be realized, and also reduce the operation load and cost load on the user.

A further object of the present invention is to provide a computer-readable storage medium which stores a file, where the file comprises various kinds of data including a data processing part and a data part which is generated from an original data, a data processing part processing the data part as a processing target, a developing part developing the data processing part and the data part, and an updating part causing the computer to update contents of the file using data modified by the developed data processing part. According to the computer-readable storage medium of the present invention, it is possible to enable reference to the same document among a plurality of apparatuses so that an efficient information sharing can be realized, and also reduce the operation load and cost load on the user.

Another object of the present invention is to provide a processing method for generating a file, comprising the steps of (a) generating a data part from an original data which is input, and (b) generating the file which includes various kinds of data including the data part and a data processing part having as a processing target the data part developed depending on an execute instruction, where the step (b) generates the file by including an updating part which updates contents of the file using data modified by the developed data processing part. According to the processing method of the present invention, it is possible to enable reference to the same document among a plurality of apparatuses so that an efficient information sharing can be realized, and also reduce the operation load and cost load on the user.

Still another object of the present invention is to provide a processing method comprising the steps of (a) developing various kinds of data from a file depending on an execute instruction, the various kinds of data including a data processing part and a data part which is generated from an original data and is used by the data processing part, and (b) updating contents of the file using data modified by the developed data processing part. According to the processing method of the present invention, it is possible to enable reference to the same document among a plurality of apparatuses so that an efficient information sharing can be realized, and also reduce the operation load and cost load on the user.

Other objects and further features of the present invention will be apparent from the following detailed description when read in conjunction with the accompanying drawings.

DESCRIPTION OF THE PREFERRED EMBODIMENTS

Figure 1:
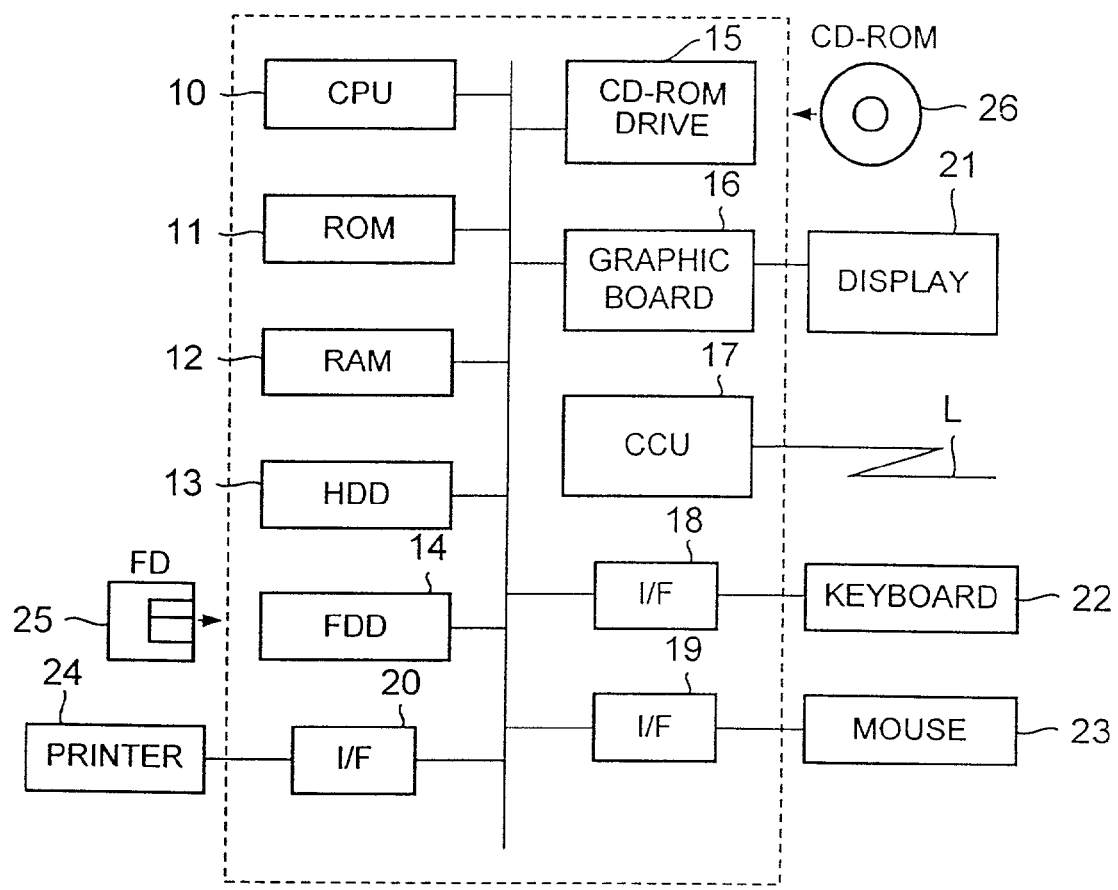
FIG. 1 is a system block diagram showing a hardware structure of an embodiment of a processing apparatus according to the present invention.

FIG. 1 is a system block diagram showing a hardware structure of an embodiment of a processing apparatus according to the present invention. This embodiment of the processing apparatus employs an embodiment of a processing method according to the present invention. In this embodiment, the present invention is applied to a computer.

The computer generally includes a CPU 10, a ROM 11, a RAM 12, a hard disk drive (HDD) 13, a floppy disk drive (FDD) 14, a CD-ROM drive 15, a graphic board 16, and a communication control unit (CCU) 17 such as a network card and a modem, which are connected as shown in FIG. 1.

A display unit 21 is connected to the graphic board 16, and a communication line L is connected to the CCU 17. In addition, the computer shown in FIG. 1 is provided with an interface (I/F) 18 which connects to a keyboard 22, an interface (I/F) 19 which connects to a mouse 23, and interface (I/F) 20 which connects to a printer 24.

The CPU 10 executes programs for carrying out various kinds of controls and processes, including the controls and processes of the present invention.

The ROM 11 stores a boot program which is executed by the CPU 10 when the power of the computer is turned ON. For example, the boot program loads an operating system (OS), various kinds of drivers for carrying out display and communication processes, and the like stored in the HDD 13 into the RAM 12, so as to put the computer in a state capable of carrying out the various kinds of controls and processes.

The programs for controlling the computer are developed in the RAM 12, and this RAM 12 is also used to hold processed results of the programs and operation data for carrying out the processes. Display data developed in the RAM 12 are supplied to the display unit 21 via the graphic board 16, and displayed on the display unit 21.

The HDD 13 is used to record programs, control data, created documents, image data and the like on a hard disk thereof. In addition, the FDD 14 is used to record the programs, the control data, the created documents, the image data and the like on a floppy disk (FD) 25. The CD-ROM drive 15 is used to read data and programs recorded on a CD-ROM 26.

The CCU 17 is used to exchange data with another computer or processing apparatus via the communication line L. The CCU 17 is also used to download a program from another computer or processing apparatus via the communication line L.

The keyboard 22 includes a plurality of alphanumeric keys and arrow keys, and is used to input various kinds of data. The mouse 23 is used to specify an arbitrary position on the screen of the display unit 21 by a mouse cursor, so as to select an instruction or the like on the screen, for example.

A program for causing the computer to carry out this embodiment of the processing method is stored in the hard disk within the HDD 13. The program may be stored in the HDD 13 from the FDD 14 when the floppy disk 25 stores the program, and may be stored in the HDD 13 from the CD-ROM drive 15 when the CD-ROM 26 stores the program. The program may also be stored in the HDD 13 by the CCU 17 which receives the program via the communication line L. The program stored in the HDD 13 is loaded into the RAM 12 by a process which will be described later in response to an execute instruction, and the loaded program controls various parts of the computer as will be described later.

A computer-readable storage medium according to the present invention is formed by a recording medium, such as the floppy disk 25 and the CD-ROM 26, which stores the program described above for causing the computer to carry out this embodiment of the processing method or, which stores a file generated by the present invention. The recording medium forming the computer-readable storage medium according to the present invention is not limited to a specific type of recording medium such as a portable type, and may be realized by any type of recording medium capable of storing the program. For example, the recording medium may be realized by semiconductor memory devices, magnetic, optical and magneto-optical recording media, and the like.

The program for causing the computer to carry out this embodiment of the processing method includes a file generating program and an editing program. The file generating program generates a file of the present invention from a target document which is to be processed. The editing program is included in the file which is generated by the file generating program.

The file generating program functions similarly to a printer driver, and also as a simple application program. The file generating program includes a conversion program for directly converting document data of a specific format into document data of a predetermined format.

Figure 2:
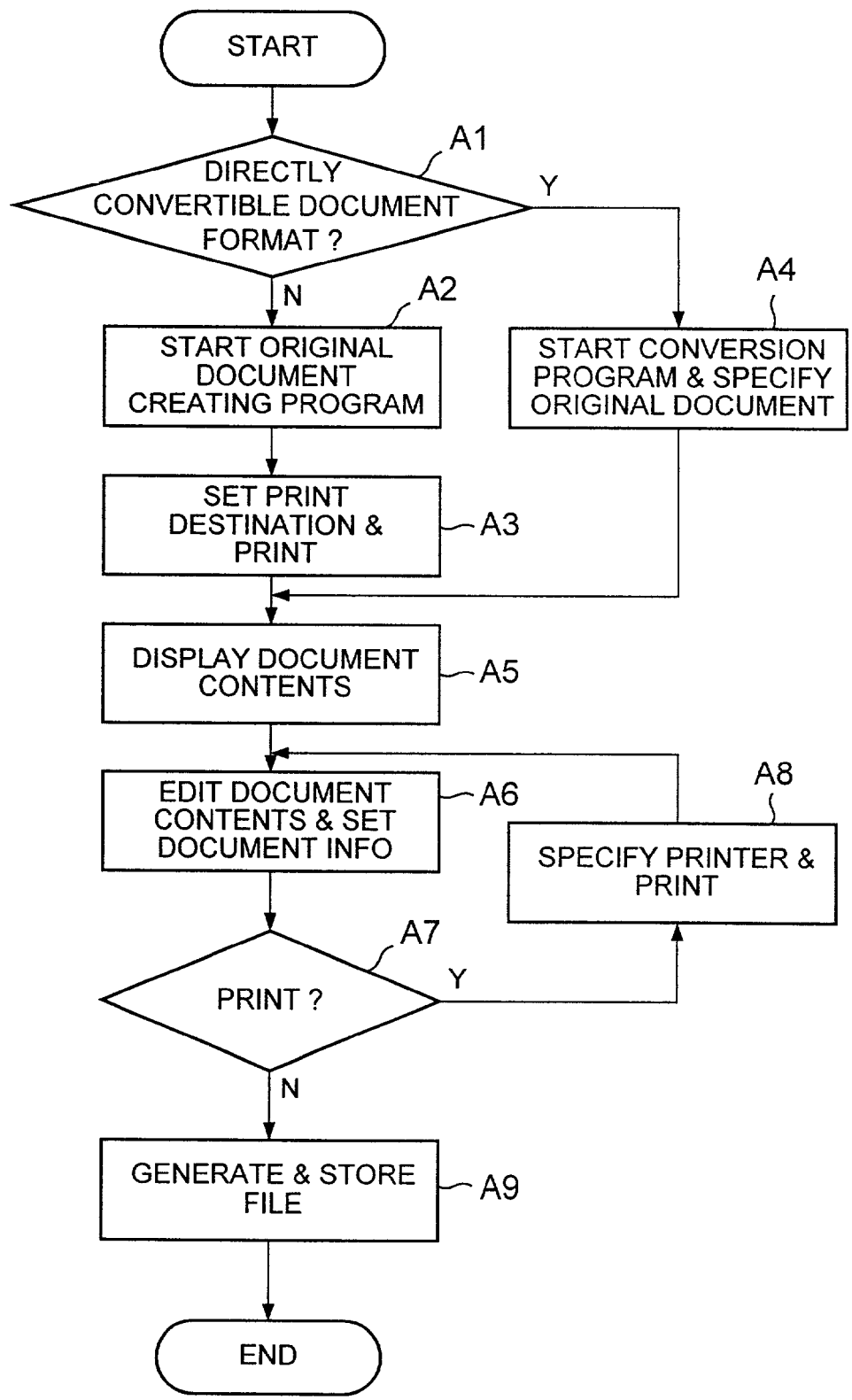
FIG. 2 is a flow chart for explaining a process of the embodiment related to file generation.

Next, a description will be given of a process related to file generation in this embodiment, by referring to FIG. 2. FIG. 2 is a flow chart for explaining the process related to the file generation in this embodiment.

In a step A1 shown in FIG. 2, the user decides whether or not an original document which is to be processed is made up of document data (data part) of the specific format which is directly convertible. If the original document is made up of document data of a format which is not directly convertible, the decision result in the step A1 is NO, and in a step A2, a document creating program which created the original document is started and the original document which is to be processed is opened.

In a step A3, the file generating program is set as a printer driver of a print destination to instruct a print process, and document data of the predetermined format is generated from processed result data of the original document output by the print process.

On the other hand, if the original document is made up of document data of a format which is directly convertible, the decision result in the step A1 is YES, and in a step A4, the file generating program is started and the original document is specified as the processing target. In addition, when the original document is specified as the processing target, the original document is analyzed by a process of the conversion program and directly converted into document data of the predetermined format.

When the document data of the predetermined format is generated by the step A3 or A4, the editing program displays document contents of the generated document data in a step A5.

In a step A6, the user carries out an editing operation with respect to the document contents by the editing program, and carries out a document information setting operation to set document information such as a document title.

In a step A7, the user decides whether or not the document contents subjected to the editing operation are to be printed. If the decision result in the step A7 is YES, the user specifies an existing printer (printer driver) to carry out a print process in a step A8, and the process returns to the step A6. On the other hand, if the user instructs an end of the editing operation by the editing program, the decision result in the step A7 is NO, and in a step A9, the file generating program generates an execute format file which includes the document data of the predetermined format and subjected to the editing process, the editing program, document information and auxiliary information. In addition, the generated execute form file is stored in the RAM 12, for example, and the process ends.

Figure 3:
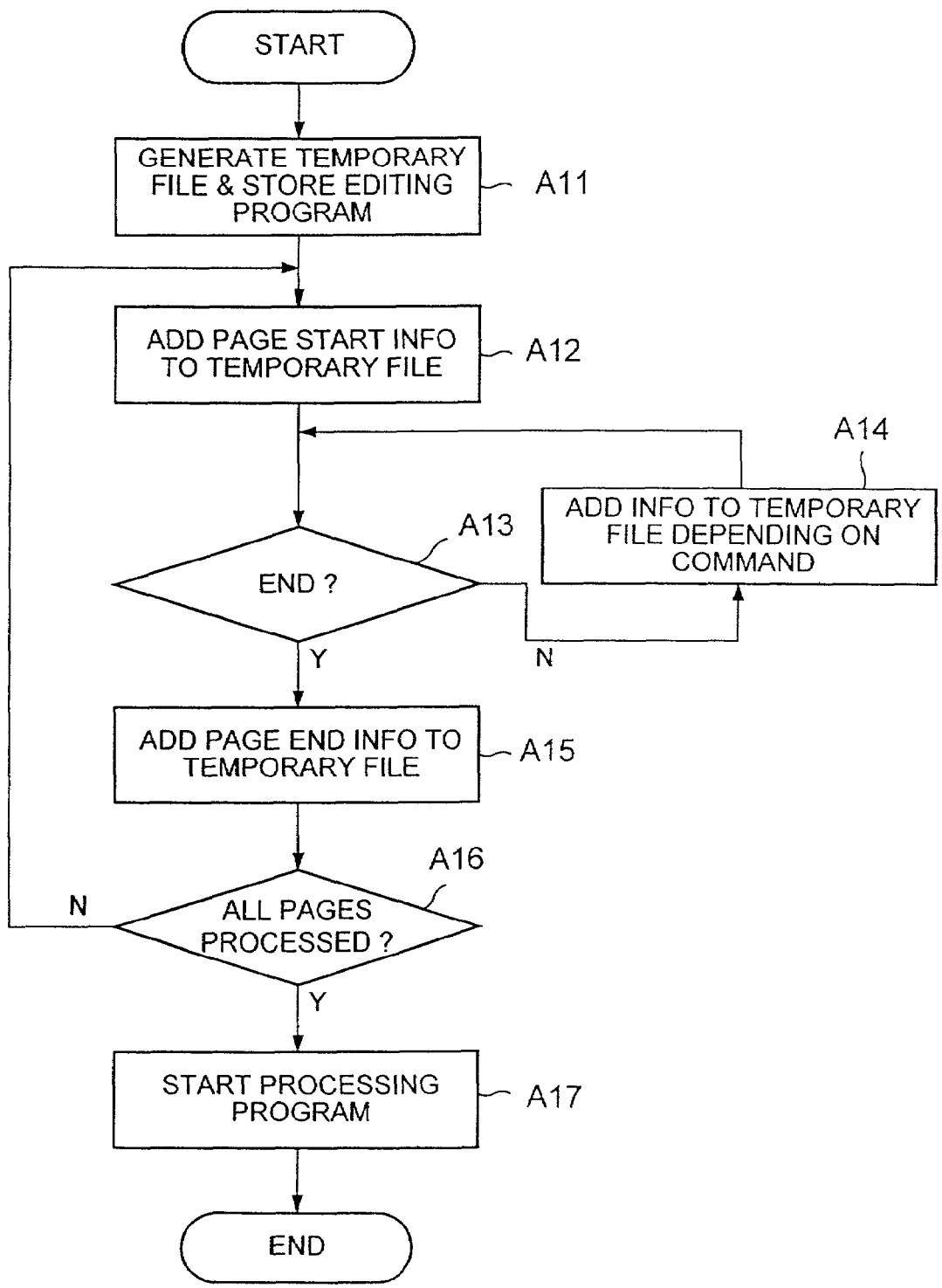
FIG. 3 is a flow chart for explaining a process of the embodiment when operating as a printer driver.

Next, a description will be given of a process of this embodiment when operating as the printer driver, by referring to FIG. 3. FIG. 3 is a flow chart for explaining the process of this embodiment when operating as the printer driver.

When the file generating program is specified as the print destination and the start of the printing process is instructed by the document creating program which processes the original document, a print start is notified from the operating system (OS), and a step A11 shown in FIG. 3 generates a temporary file in response to this notification from the operating system and stores the editing program in the temporary file.

Thereafter, when a notification indicating a start of a page is received from the operating system, a step A12 additionally stores information of the start of the page (page start information) in the temporary file. A step A13 decides whether or not a command indicates an end. If the decision result in the step A13 is NO, the process advances to a step A14. Since commands and parameters forming print data of the original document or real data are successively notified from the operating system, the step A14 further stores the commands and parameters or the real data in the temporary file, and the process returns to the step A13. For example, the commands forming the print data include a command which indicates drawing of a character, a command which indicates drawing of a line or rectangle, and a command which indicates a bit map output. Hence, the parameters and the real data are additionally stored in the temporary file depending on the received command.

If the decision result in the step A13 is YES and a notification indicating the end of the page is received from the operating system, a step A15 additionally stores information indicating the end of the page (page end information) in the temporary file.

A step A16 decides whether or not all pages have been processed, and the process returns to the step A12 if the decision result in the step A12 is NO. On the other hand, if the decision result in the step A16 is YES and a notification indicating the end of printing is received from the operating system, a step A17 ends the file generating process, and the processing program is started by specifying the generated temporary file as the processing target. The process ends after the step A17.

Figure 4:
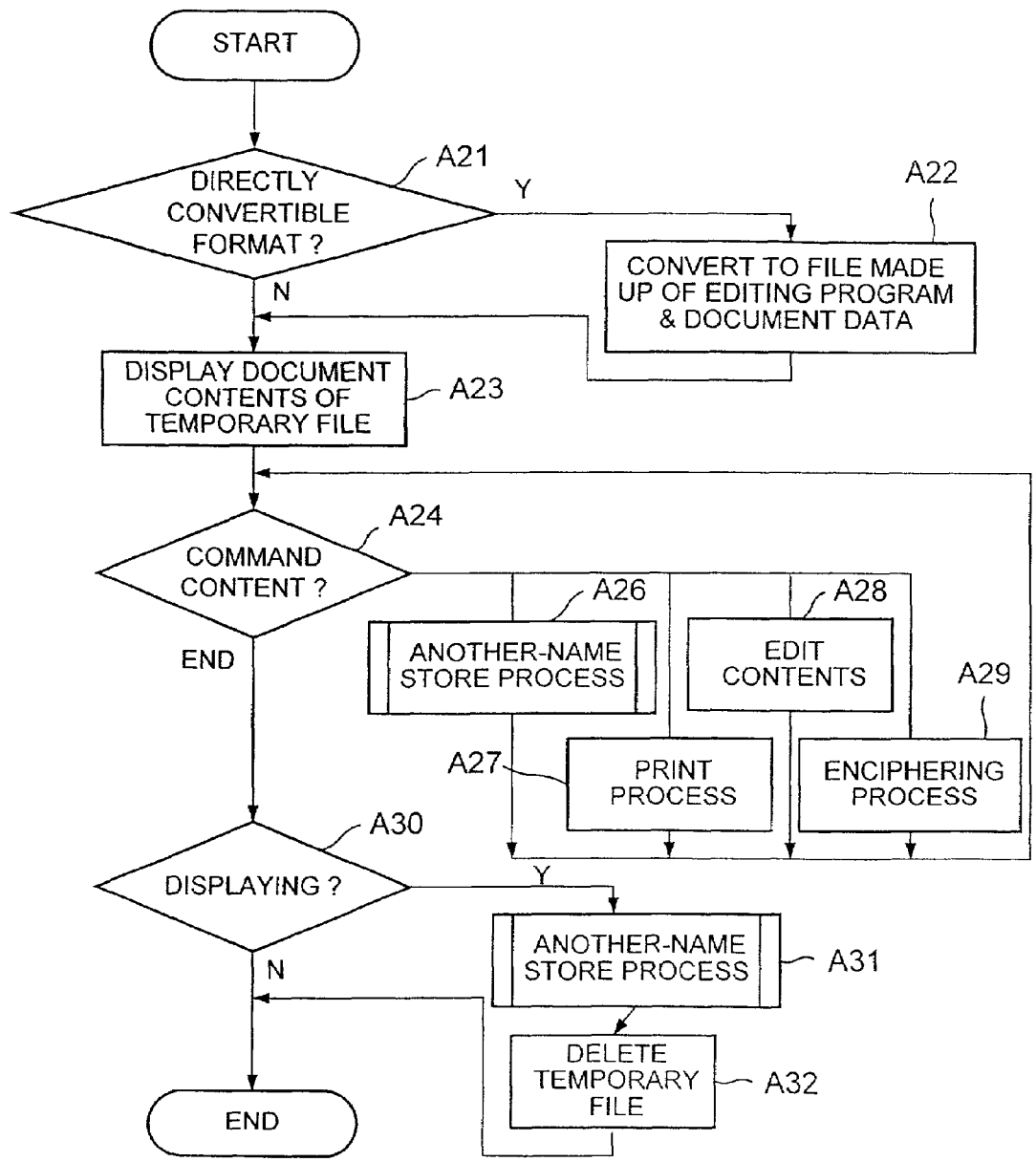
FIG. 4 is a flow chart for explaining a process of the embodiment when a file generating program is started as a simple application.

FIG. 4 is a flow chart for explaining a process of this embodiment when the file generating program is started as a simple application (processing program). The process shown in FIG. 4 may be carried out after the step A17 shown in FIG. 3.

A step A21 shown in FIG. 4 decides whether or not the file (document) which is specified as the processing target has a directly convertible format. When the file generating program is instructed to start as the application in this embodiment, a conversion process can only be carried out with respect to the file having the directly convertible format. Hence, if the decision result in the step A21 is YES, a step A22 directly converts the data contents of the file into the predetermined format, and generates the temporary file made up of the editing program and the converted data obtained by the direct conversion, before advancing to a step A23. Because the start of the processing program of this embodiment is instructed after operation as the printer driver, the file which is the processing target is a temporary file which includes the editing program and the data having the predetermined format. Hence, if the decision result in the step A21 is NO, the process advances to the step A23 directly, without carrying out the step A22.

The step A23 displays the data contents (document contents) of the temporary file which is the processing target on the screen of the display unit 21. For example, when the processing program of this embodiment operates in a window system, the data contents of the temporary file are displayed in one window on the screen, and a known user interface is displayed within the window. The user interface includes a menu which can issue a processing command depending on a selection made by the user, a tool bar which includes a collection of buttons which may be selected by the user, and the like. In this embodiment, it is assumed for the sake of convenience that the menu includes edit, print, another-name store, and encipher set.

A step A24 waits for a command to be specified by the user, and decides the content of the specified command. If the specified command indicates another-name store, the process advances to a step A26 for carrying out an another-name store process which will be described later. If the specified command indicates print, the process advances to a step A27 for carrying out a print process which prints the displayed data contents on the existing printer such as the printer 24. When carrying out this print process, a printer driver corresponding to the existing printer may be specified using a known print dialog.

On the other hand, if the specified command indicates edit, the process advances to a step A28 which enables an editing operation to be carried out on the data contents displayed on the screen. The edit operation includes addition, deletion, modification and the like of the data contents. If the specified command indicates encipher set, the process advances to a step A29 for carrying out an enciphering process which uses a predetermined algorithm with respect to the displayed data contents, so as to convert the data contents into enciphered data contents which are incomprehensible and store the enciphered data contents in the RAM 12, for example. When the specified command indicates this encipher set, the user is urged to set enciphering information as auxiliary information for enabling deciphering of the enciphered data contents. The enciphering process itself may employ any known enciphering technique.

After any of the steps A26, A27, A28 and A29, the process returns to the step A24. If the specified command is an end command, the process advances to a step A30 from the step A24. The step A30 decides whether or not the data contents are being displayed on the screen. If the decision result in the step A30 is YES, a step A31 carries out the another-name store process which will be described later, and a step A32 deletes the temporary file. The process ends after the step A32 or if the decision result in the step A30 is NO.

Figure 5:
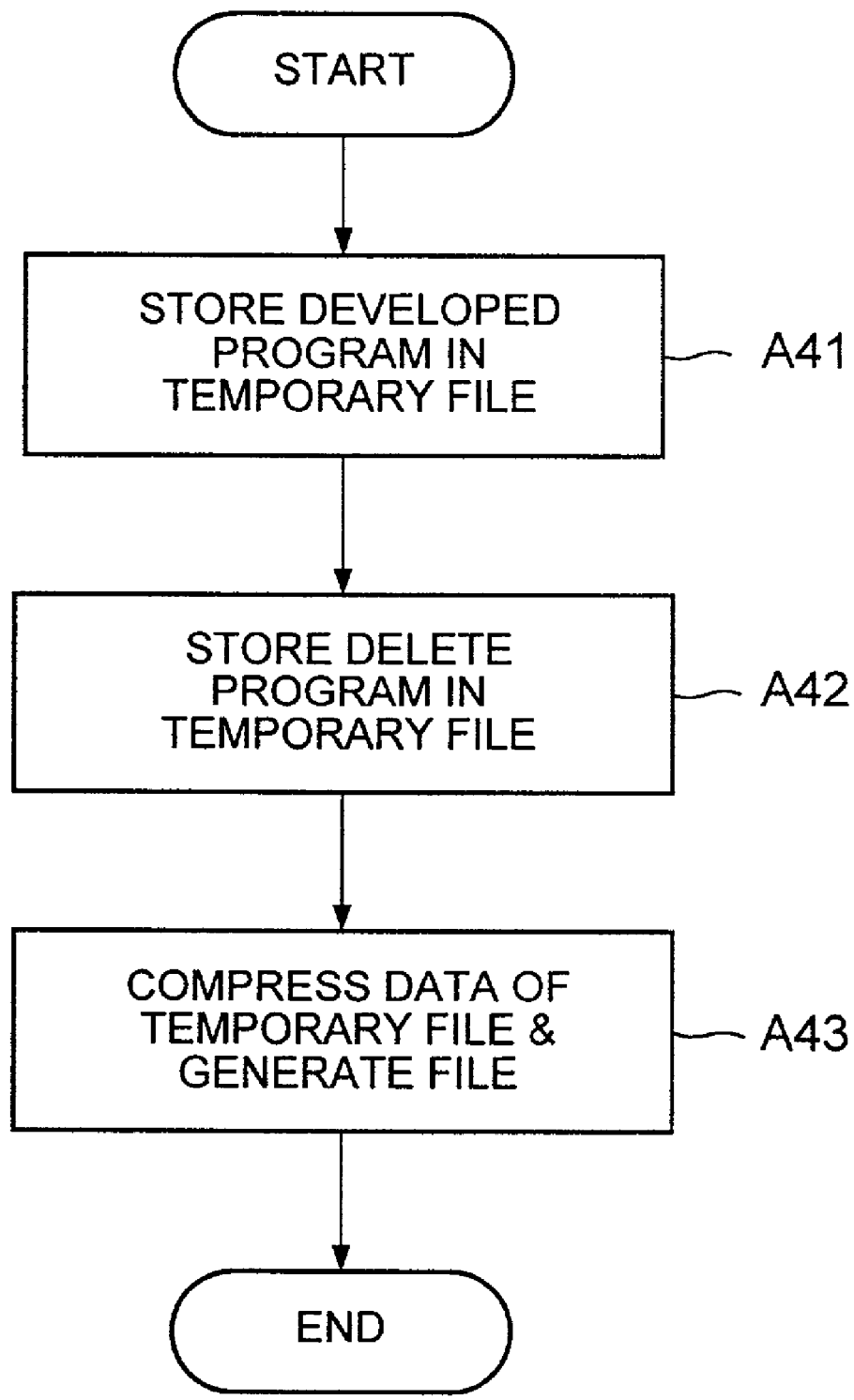
FIG. 5 is a flow chart for explaining a process related to an another-name store process.

FIG. 5 is a flow chart for explaining a process related to the another-name store process carried out in the step A26 or A31 shown in FIG. 4.

At the start of the another-name store process, the editing program and the data having the predetermined format are already stored in the temporary file. In FIG. 4, a step A41 additionally, stores a developing program in the temporary file. This developing program carries out a process of expanding and separating the editing program and the various kinds of data which have been compressed by a process which will be described later.

A step A42 additionally stores a delete program in the temporary file. This delete program deletes the developed editing program and various kinds of data from the original execute form file, when updating the contents of the execute form file which is generated by the another-name store process.

After the developing program, the delete program and the like are additionally stored in the temporary file, a step A43 additionally stores the document information and the auxiliary information in the temporary file, and subjects the editing program and the various kinds of data such as the document data, the document information and the auxiliary information to a compressing process using a predetermined algorithm. Any known algorithm may be used for the predetermined algorithm of the compressing process. Thereafter, the step A43 generates the execute form file from the temporary file, and the process ends.

The execute form file is indicated by a predetermined file extender such as "exe". When an execute instruction is made with respect to the execute form file, modules and data included in the execute form file are developed in the RAM 12 or the like, similarly to the case of a known processing method. For the sake of convenience, this embodiment uses a file name of the original document as a file name of the execute form file.

The execute form file is thus generated by the process described above.

Figure 6:
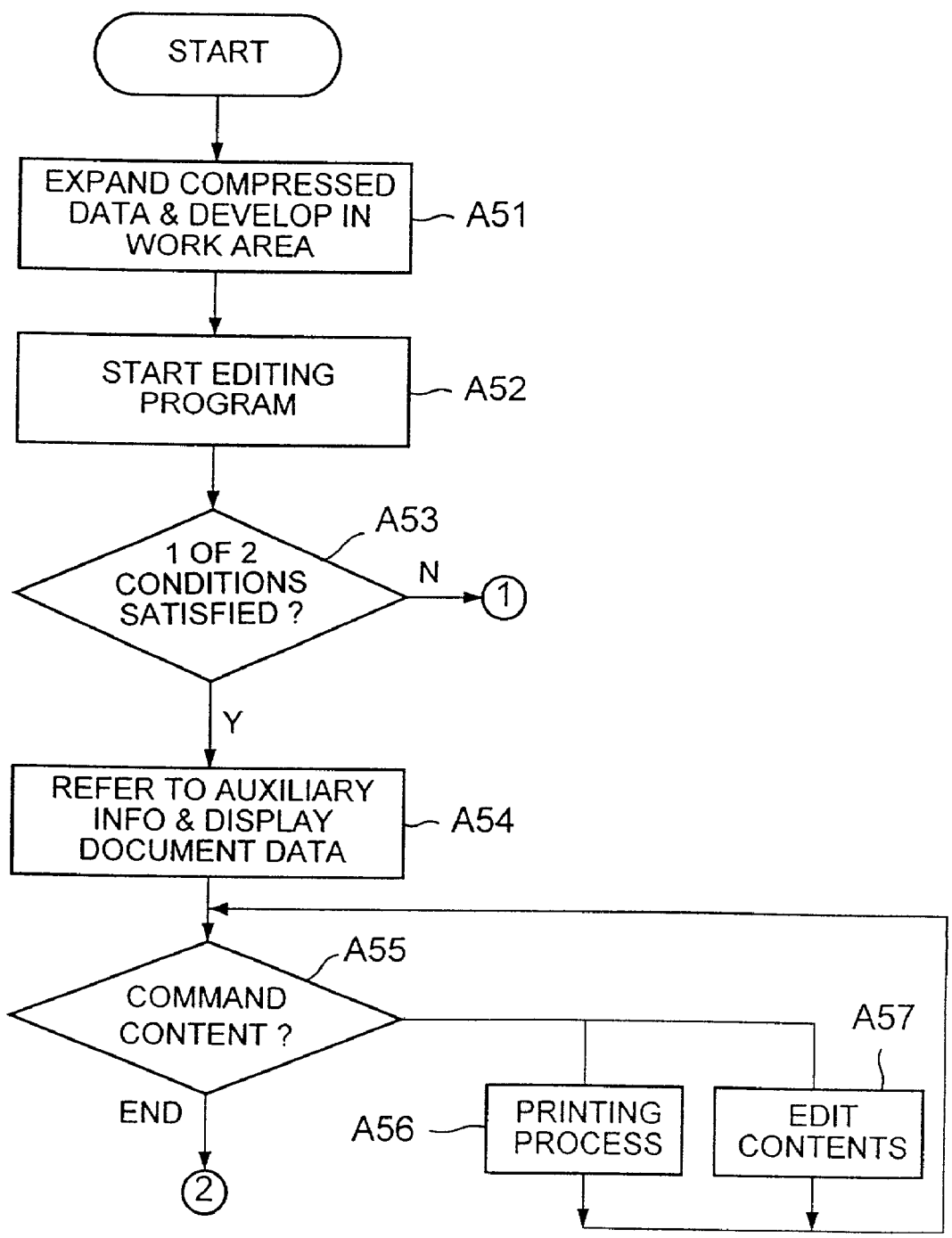
FIG. 6 is a flow chart for explaining a process of the embodiment using an execute form file.
Figure 7:
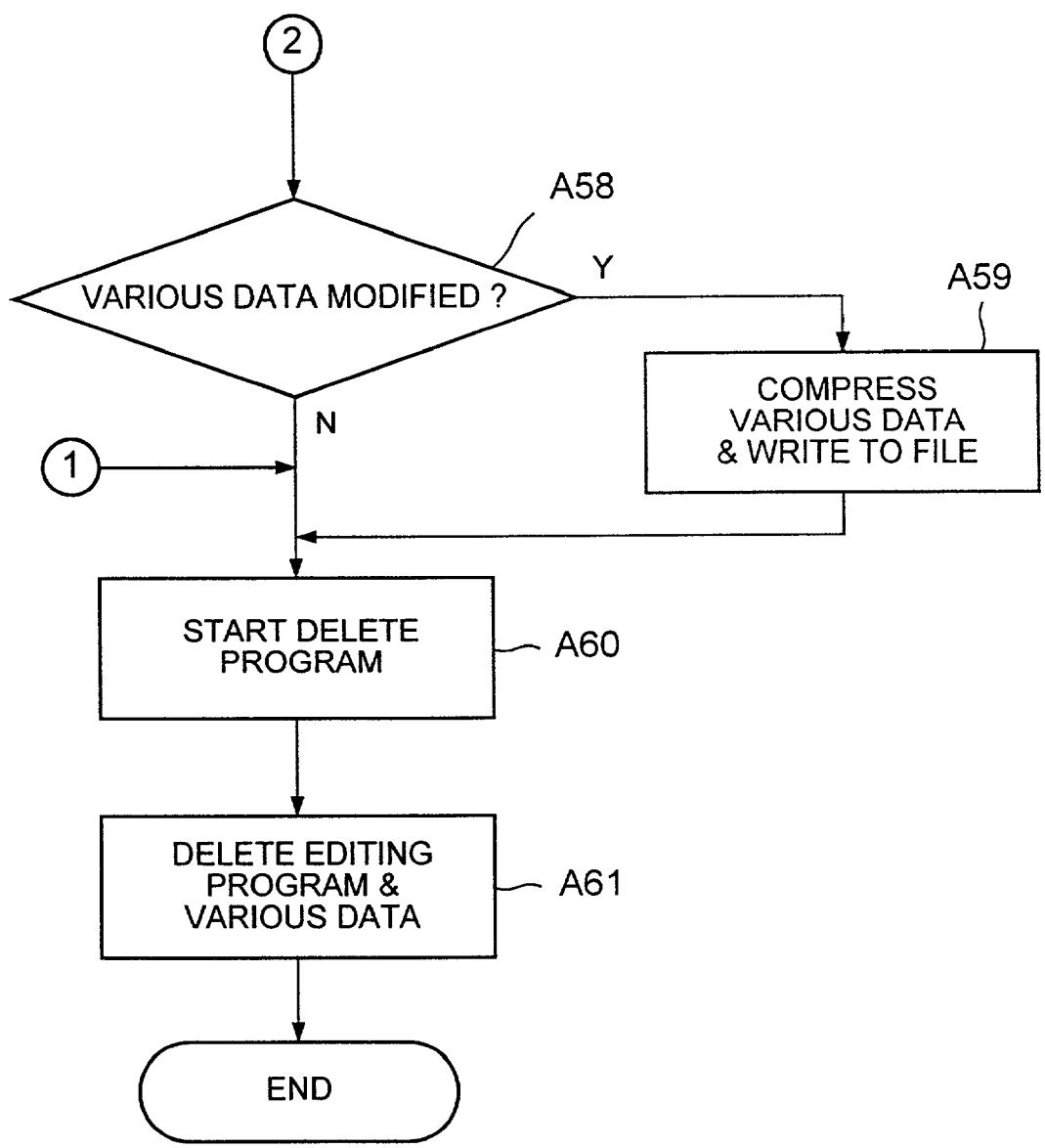
FIG. 7 is a flow chart for explaining the process of the embodiment using the execute form file.
Figure 8:
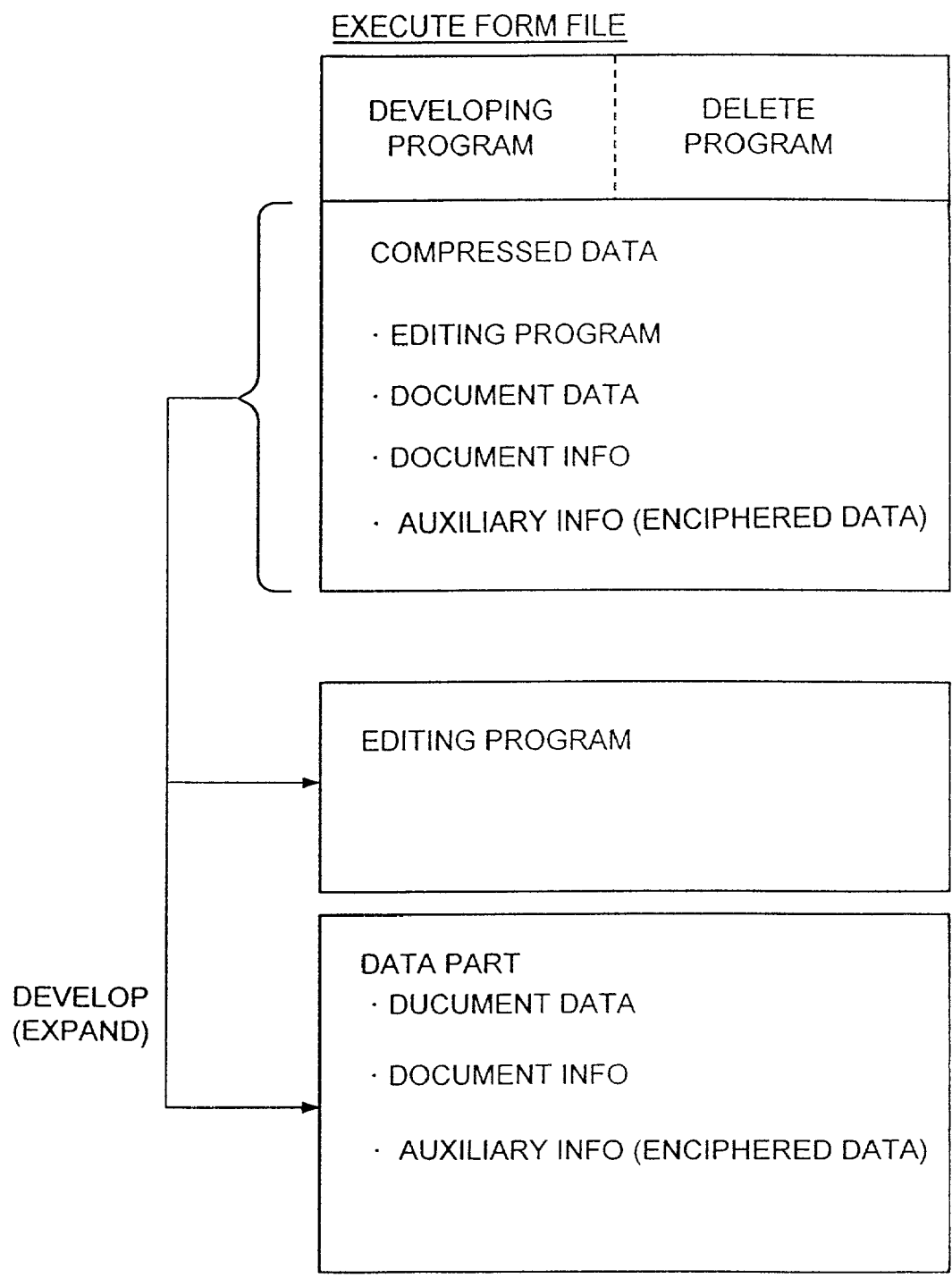
FIG. 8 is a diagram showing a structure of the execute form file.

Next, a description will be given of a process which is carried out when the user makes the execute instruction with respect to the execute form file, by referring to FIGS. 6 through 8. FIGS. 6 and 7 are flow charts for explaining a process of this embodiment using the execute form file. In addition, FIG. 8 is a diagram showing a structure of the execute form file.

When the user makes the execute instruction, a step A51 shown in FIG. 6 carries out an expanding process with respect to the compressed data included in the execute form file, and develops the expanded editing program and various kinds of data in a work region of the RAM 12, for example, by the developing program. In addition, a step A52 starts the editing program which is developed in the work region of the RAM 12.

Next, a description will be given of the structure of the execute form file in this embodiment, by referring to FIG. 8. As shown in FIG. 8, the execute form file in this embodiment includes a developing program storage block, a delete program storage block, and a compressed data storage block. The compressed data are generated by compressing the editing program, the document data-which is the main target of the reference and editing, the document information and the auxiliary information.

When the expanding process with respect to the compressed data is carried out by the step A51 shown in FIG. 6, the compressed data is separated into the editing program and the data part and developed in the work region of the RAM 12. The data part includes the document data, the document information and the auxiliary information. In addition, a step A52 starts the editing program.

A step A53 decides whether or not one of two conditions are satisfied, where one condition is that the enciphering information included in the auxiliary information developed in the RAM 12 is not set, and the other condition is that the enciphering information is set and the correct enciphering information is input by the user. If one of the two conditions is satisfied, the decision result in the step A53 is YES, and the process advances to a step A54. On the other hand, if neither one of the two conditions is satisfied, the decision result in the step A53 is NO, and the process advances to a step A60 shown in FIG. 7 which will be described later.

If the decision result in the step A53 is YES, the editing program refers to display position information included in the auxiliary information and displays the document data in a step A54. The display position information indicates a page number of the document data which is displayed when ending execution of the execute form file. Hence, a display state of the document data during a previous execution of the execute form file can be restored by referring to the display position information.

In a case where the window system is employed in this embodiment, the document data is also displayed in one window, and the known user interface such as the menu and the tool bar is also displayed in the window.

When the document data is displayed, a step A55 waits for a command to be specified by the user, and judges the content of the specified command. In this embodiment, it is assumed for the sake of convenience that the content of the specified command may indicate print, edit or end.

If the content of the specified command indicates print, a step A56 carries out a print process to print the displayed data contents by the existing printer such as the printer 24. This print process may be carried out by specifying a printer driver corresponding to the existing printer using a known print dialog.

On the other hand, if the content of the specific command indicates edit, a step A57 which enables an editing operation to be carried out on the displayed data contents. The edit operation includes addition, deletion and modification of the contents, and setting, deletion and modification of the document information. When the document data or the document information is modified by the editing process, flag information which indicates a modification of the contents is held in the work region of the RAM 12, and this flag information is used for a judgement which is carried out in a step A58 shown in FIG. 7 which will be described later.

After the step A56 or A57, the process returns to the step A55. In addition, if the content of the specified command indicates end (that is, in the case of an end command), the process advances to the step A58 shown in FIG. 7.

In FIG. 7, the step A58 decides whether or not a modification has been made in the various kinds of data. The modification to the document data and the document information can be judged from the flag information described above. In addition, by comparing the page number of the document data which is presently displayed and the display position information developed in the RAM 12, it is possible to judge whether or not the display position of the page has been modified.

When it is judged that the document data and document information or, the auxiliary information such as the display position information has been modified and the decision result in the step A58 is YES, the compressing process using the predetermined algorithm described above is carried out with respect to the various kinds of data such as the document data, the document information and the auxiliary information in a step A59. Further, the compressed data is then written in corresponding blocks of the execute form file in the step A59, to generate an execute form file in which the contents have been modified.

The process advances to a step A60 if the decision result in the step A53 shown in FIG. 6 is NO, if the decision result in the step A58 shown in FIG. 7 is NO or, after the step A59. In the step A60, the editing program starts the delete program included in the execute form file. Thereafter, the editing program stored in the work region and the delete process with respect to the various kinds of data are carried out in a step A61, and the process ends.

Further, the present invention is not limited to these embodiments, but various variations and modifications may be made without departing from the scope of the present invention.

What is claimed is:

1. A processing apparatus for generating an executable file, comprising:
   a data generating part generating a data part from an original print data comprising commands and data; and
   a file generating part generating the executable file which includes a data processing part having the data part as a processing target, an updating part, and the data part;
   wherein the data processing part includes at least a developing part configured to develop the updating part and the data part in response to an execute instruction, and the updating part is configured to update, when developed by the developing part, contents of the executable file using the data developed by the developing part.

2. The processing apparatus as claimed in claim 1, wherein:
   said data part includes auxiliary information;
   said auxiliary information indicates a position of the data part at a time of an initial display when the data part is initially displayed by the data processing part; and
   said data processing part displays the data part from the position indicated by the auxiliary information at the time of the initial display.

3. A processing apparatus comprising:
   a processing Dart to process an executable file which includes a data part generated from an original print data comprising commands and data, an updating part, and a data processing part having the data cart as a processing target;
   wherein the data processing part includes at least a developing part configured to develop the updating part and the data part in response to an execute instruction, and the updating part is configured to update, when developed by the developing part, contents of the executable file using the data developed by the developing part.

4. The processing apparatus as claimed in claim 3, wherein:
   said data part includes auxiliary information;
   said auxiliary information indicates a position of the data part at a time of an initial display when the data part is initially displayed by the data processing part; and
   said data processing part displays the data part from the position indicated by the auxiliary information at the time of the initial display.

5. The processing apparatus as claimed in claim 4, wherein said updating part updates the auxiliary information to a present display position of the data part depending on an end instruction.

6. The processing apparatus as claimed in claim 3, further comprising:
   a delete part deleting the developed updating part and data part at an end of a process.

7. A computer-readable storage medium which stores a program for causing a computer to generate an executable file, said program comprising:
   a data generating procedure causing the computer to generate a data part from an original print data comprising commanded data; and
   a file generating procedure causing the computer to generate the executable file which includes a data processing part having the data part as a processing target, an updating part, and the data part:
   wherein the data processing part includes at least a developing part configured to develop the updating part and the data part in response to an execute instruction, and the updating part is configured to update, when developed by the developing part, contents of the executable file using the date developed by the developing part.

8. The computer-readable storage medium as claimed in claim 7, wherein:
   said data part includes auxiliary information;
   said auxiliary information indicates a position of the data part at a time of an initial display when the data part is initially displayed by the data processing part; and
   said data processing part causes the computer to display the data part from the position indicated by the auxiliary information at the time of the initial display.

9. A computer-readable storage medium which stores a program for causing a computer to process an executable file, said program comprising:
   a file processing procedure to process an executable file which includes a data part generated from an original print data comprising commands and data, an updating part, and a data processing part having the data part as a processing target;
   wherein the data processing part includes at least a develop in art configured to develop the updating part and the data part in response to an execute instruction, and the updating part is configured to update, when developed by the developing part, contents of the executable file using the data developed by the developing part.

10. The computer-readable storage medium as claimed in claim 9, wherein:
    said data part includes auxiliary information;
    said auxiliary information indicates a position of the data part at a time of an initial display when the data part is initially displayed by the data processing part; and
    said data processing part causes the computer to display the data part from the position indicated by the auxiliary information at the time of the initial display.

11. The computer-readable storage medium as claimed in claim 10, wherein said updating part causes the computer to update the auxiliary information to a present display position of the data part depending on an end instruction.

12. The computer-readable storage medium as claimed in claim 9, said program further comprising:
    a delete procedure causing the computer to delete the developed updating part and data part at an end of a process.

13. computer-readable storage medium which stores an executable file, said file comprising:
    a data part which is generated from an original print data comprising commands and data;
    a data processing part processing the data part as a processing target; and
    an updating part;
    wherein the data processing part includes at least a developing part configured to develop the updating part and the data part in response to an execute instruction, and the updating part is configured to update, when developed by the developing part, contents of the executable file using the data developed by the developing part.

14. The computer-readable storage medium as claimed in claim 13, wherein:
    said data part includes auxiliary information;
    said auxiliary information indicates a position of the data part at a time of an initial display when the data part is initially displayed by the data processing part; and said data processing part causes the computer to display the data part from the position indicated by the auxiliary information at the time of the initial display.

15. The computer-readable storage medium as claimed in claim 13, said executable file further comprising:
a delete part deleting the developed data deleting the developed updating part and data part at an end of a process.

16. A processing method for generating an executable file, comprising:
generating a data part from an original print data comprising commands and data; and
generating the executable file which includes a data processing part having the data part as a processing target, an updating part, and the data part;
wherein the data processing part includes at least a developing part configured to develop the updating part and the data part in response to an execute instruction, and the updating part is configured to update when developed by the developing part, contents of the executable file using the data developed by the developing part.

17. The processing method as claimed in claim 16, wherein:
said data part includes auxiliary information;
said auxiliary information indicates a position of the data part at a time of an initial display when the data part is initially displayed by the data processing part; and
said data processing part displays the data part from the position indicated by the auxiliary information at the time of the initial display.

18. A processing method, comprising:
processing an executable file which includes a data cart generated from an original print data comprising commands and data, an updating part, and a data processing part having the data part as a processing target;
wherein the data processing part includes at least a developing part configured to develop the updating part and the data part in response to an execute instruction, and the updating part is configured to update, when developed by the developing part, contents of the executable file using the data developed by the developing part.

19. The processing method as claimed 18, wherein:
said data part includes auxiliary information;
said auxiliary information indicates a position of the data part at a time of an initial display when the data part is initially displayed by the data processing part; and
said data processing part displays the data part from the position indicated by the auxiliary information at the time of the initial display.

20. The processing method as claimed in claim 19, wherein said updating includes updates of the auxiliary information to a present display position of the data part depending on an end instruction.

21. The processing method as claimed in claim 18, further comprising:
deleting the developed updating part and data part at an end of a process.

* * * * *

UNITED STATES PATENT AND TRADEMARK OFFICE
CERTIFICATE OF CORRECTION

PATENT NO. : 7,287,095 B2 Page 1 of 1
APPLICATION NO. : 09/812846
DATED : October 23, 2007
INVENTOR(S) : Tadaatsu Nagumo It is certified that error appears in the above-identified patent and that said Letters Patent is hereby corrected as shown below:

Column 11, Line 26, change "Dart" to --part--.

Column 11, Line 29, change "cart" to --part--.

Column 11, Line 60, change "commanded data;" to --commands and data;--.

Column 12, Line 3, change "date" to --data--.

Column 12, Line 23, change "develop in art" to --developing part--.

Column 12, Line 47, before "computer-readable" insert --A--.

Column 14, Line 2, change "cart" to --part--.

Column 14, Line 13, after "claimed" insert --in claim--.

Signed and Sealed this

Sixth Day of May, 2008

JON W. DUDAS
*Director of the United States Patent and Trademark Office*